Patented Jan. 19, 1954

2,666,793

UNITED STATES PATENT OFFICE 2,666,793

PREPARATION OF KETONE-DIARYLAMINE CONDENSATES

Ivan Mankowich, Naugatuck, Conn., assignor to United States Rubber Company, New York, N. Y., a corporation of New Jersey No Drawing. Application July 3, 1951,
Serial No. 235,105

6 Claims. (Cl. 260—576)

This invention relates to improvements in the preparation of the condensation products of aliphatic ketones and diarylamines.

The condensation products of aliphatic ketones with diarylamines, especially the condensation product of acetone with diphenylamine, and acetone with phenyl betanaphthylamine have been sold widely as rubber antioxidants. Ordinarily, these have been prepared in the presence of an acidic catalyst such as iodine, ferrous iodide, hydriodic acid, hydrogen bromide, zinc chloride, calcium chloride, etc.

It has now been found that the condensation of aliphatic ketones and diarylamines can be promoted by a compound selected from the class consisting of halogenated phenols and halogenated aromatic amines, the halogen having an atomic weight of at least 35.

An excess of either ketone or amine can be used or they can be reacted in equimolecular proportions. It is preferred, however, to have the ketone in excess.

Exemplary of such chemical promoters are: ortho, meta, and para chloro phenol; ortho, meta, and para bromo phenol; ortho, meta, and para iodo phenol; ortho, meta, and para bromo aniline; ortho, meta, and para bromo-N-methyl aniline; ortho, meta, and para bromo N,N-dimethylaniline; m-bromo o-methoxy aniline; m-iodo o-ethoxy aniline.

The amount of the promoter to be used can vary from 0.03 to 10%, or better, but is preferably 0.05 to 5.0% of the weight of the diarylamine, and will depend on:

1. The nature of the promoter, the diarylamine and the ketone.
2. The time cycle of production.
3. The temperature of reaction.
4. The desired viscosity of the product.
5. The range of proportions of the ketone and the diarylamine.

The reaction initiator may be added as such, or dissolved in the ketone, or in the diarylamine, before the reactants are brought to reaction temperature or, alternately, the reactants may be brought to temperature before the addition of the promoter. Furthermore, mixtures of the promoters may be used. Another variation is the concurrent addition of the reactants to a heated reaction zone.

It is well-known that the reaction of an aliphatic ketone and a diarylamine can be carried out by reflux, by passage of ketone vapor through the amine, and by autoclaving of the reactants at 140° C. upwards. The promoters of this invention are applicable to all these methods.

While the use of the present reaction promoters is primarily intended in the systems, acetone-diphenylamine, and acetone-phenyl betanaphthylamine, other aliphatic ketone-diarylamine systems, such as:

acetone-phenyl alpha-naphthylamine
acetone-phenyl-p-tolylamine
acetone-di-p-tolylamine
methyl ethyl ketone-diphenylamine
methyl ethyl ketone-phenyl-b-naphthylamine
methyl ethyl ketone-phenyl xenylamine
methyl ethyl ketone-phenyl-a-naphthylamine may be used, and are also subject to reaction initiation, by the promoters of this invention.

The following example illustrates the invention:

Example 1

In the following table, the run in a sealed glass tube is described. In this case 59.6 gr. diphenylamine and 39.7 gr. acetone were used. The general conditions of reaction were six hours at 240–250° C. The glass tube, after cooling, was opened and the reaction freed of unreacted acetone, water, etc. by drying at ca. 5 mm. to 150° C.

| Run No. | Catalyst | Amount in grams | Gram yield of condensation product | Condensate viscosity (poises at 30° C.) |
|---|---|---|---|---|
| 1 | Orthoiodo phenol | 0.477 | 77.6 | 145 |
| 2 | Para chloro ortho amino phenol | .312 | 68 | 45 |
| 3 | Alpha bromo beta naphthol | .485 | 73.7 | 193 |
| 4 | Ortho bromo aniline | .374 | 70.3 | 13.3 |
| 5 | Para bromo aniline | .374 | 72.0 | 75.1 |

The products of condensation of this invention may also be used as antioxidants for rubber and rubber-like materials which are subject to deterioration by air.

Having thus described my invention, what I claim and desire to protect by Letters Patent is:

1. In a method of preparing a composite product of condensation of an aliphatic ketone and a diarylamine, the improvement which consists in adding to the reaction mix, a chemical promoter selected from the class consisting of o-chloro phenol, m-chloro phenol, p-chloro phenol, o-bromo phenol, m-bromo phenol, p-bromo phenol, o-iodo phenol, m-iodo phenol, p-iodo phenol, o-bromo aniline, m-bromo aniline, p-bromo aniline, o-bromo-N-methyl aniline, m-bromo-N-methyl aniline, p-bromo-N-methyl aniline, o-bromo N,N-dimethyl aniline, m-bromo N,N-dimethyl aniline, p-bromo N,N-dimethyl aniline, m-bromo o-methoxy aniline, and m-iodo o-ethoxy aniline, and heating the mix in the presence of said promoter.

2. In a method of preparing a composite product of condensation of an aliphatic ketone and a diarylamine, the improvement which consists in adding to the reaction mix, a chemical promoter which is orthoiodo phenol, and heating the mix in the presence of said promoter.

3. In a method of preparing a composite product of condensation of an aliphatic ketone and a diarylamine, the improvement which consists in adding to the reaction mix, a chemical promoter which is p-chloro o-aminophenol, and heating the mix in the presence of said promoter.

4. In a method of preparing a composite product of condensation of an aliphatic ketone and a diarylamine, the improvement which consists in adding to the reaction mix, a chemical promoter which is alpha-bromo beta-naphthol, and heating the mix in the presence of said promoter.

5. In a method of preparing a composite product of condensation of an aliphatic ketone and a diarylamine, the improvement which consists in adding to the reaction mix, a chemical promoter which is o-bromo aniline, and heating the mix in the presence of said promoter.

6. In a method of preparing a composite product of condensation of an aliphatic ketone and a diarylamine, the improvement which consists in adding to the reaction mix, a chemical promoter which is p-bromo aniline, and heating the mix in the presence of said promoter.

IVAN MANKOWICH.

References Cited in the file of this patent

UNITED STATES PATENTS

| Number | Name | Date |
|---|---|---|
| 1,935,279 | ter Horst | Nov. 14, 1933 |
| 2,160,223 | Meuser | May 30, 1939 |